(12) United States Patent
Litvinov et al.

(10) Patent No.: US 8,953,049 B2
(45) Date of Patent: Feb. 10, 2015

(54) TELEVISION RECEIVER—PROJECTOR COMPENSATING OPTICAL PROPERTIES OF PROJECTION SURFACE

(75) Inventors: Maxim Litvinov, Kharkov (UA); Andrey Kuplevakhsky, Kharkov (UA); Taras Stetsyuk, Kharkov (UA); Denys Gonchar, Kharkov (UA)

(73) Assignee: EchoStar Ukraine L.L.C., Kharkov (UA)

( * ) Notice: Subject to any disclaimer, the term of this patent is extended or adjusted under 35 U.S.C. 154(b) by 0 days.

(21) Appl. No.: 13/990,780

(22) PCT Filed: Nov. 24, 2010

(86) PCT No.: PCT/UA2010/000088
§ 371 (c)(1),
(2), (4) Date: Aug. 12, 2013

(87) PCT Pub. No.: WO2012/071023
PCT Pub. Date: May 31, 2012

(65) Prior Publication Data
US 2013/0314550 A1  Nov. 28, 2013

(51) Int. Cl.
*H04N 17/00* (2006.01)
*H04N 17/02* (2006.01)
(Continued)

(52) U.S. Cl.
CPC ............ *H04N 9/3191* (2013.01); *H04N 1/603* (2013.01); *H04N 1/6083* (2013.01); *H04N 5/58* (2013.01); *H04N 9/3182* (2013.01); *H04N 9/3194* (2013.01); *H04N 9/3188* (2013.01); *H04N 21/4122* (2013.01); *H01N 21/42202* (2013.01); *H04N 21/4318* (2013.01)

USPC .......................... 348/177; 348/189; 348/745

(58) Field of Classification Search
CPC ..... H04N 1/60; H04N 1/6033; H04N 1/6055; H04N 9/3194; H04N 13/0425; H04N 17/04; H04N 17/004; H04N 17/045; G01J 3/46; G01J 3/524; G03B 21/56; G09G 2320/0666; G09G 2320/0693; G09G 2320/0626; G09G 2360/144; G09G 2360/145; G09G 2320/02; G09G 2320/08; G09G 2320/0233
USPC ................. 348/177–180, 184, 744–747, 189
See application file for complete search history.

(56) References Cited

U.S. PATENT DOCUMENTS

| 4,485,394 A | 11/1984 | Ghaem-Maghami et al. |
| 5,231,481 A * | 7/1993 | Eouzan et al. ................ 348/658 |

(Continued)

FOREIGN PATENT DOCUMENTS

EP  1 696 679 A1  8/2006

OTHER PUBLICATIONS

International Search Report, mailed Dec. 1, 2011, for PCT/UA2010/000088, 4 pages.

*Primary Examiner* — Brian Yenke
(74) *Attorney, Agent, or Firm* — Seed IP Law Group PLLC

(57) ABSTRACT

Disclosure is directed to providing projected output from a receiver that includes ambiance or environmental images and sounds for display to and/or listening by a user. Other aspects are directed to processing or altering program service video to produce a compensated video that is output by a projector component of a receiver. The modified image compensates for characteristics associated with the ambient light conditions and/or characteristics of the projection surface upon which the projector outputs an image.

21 Claims, 8 Drawing Sheets

(51) Int. Cl.
*H04N 3/22* (2006.01)
*H04N 3/26* (2006.01)
*H04N 9/31* (2006.01)
*H04N 1/60* (2006.01)
*H04N 5/58* (2006.01)
*H04N 21/41* (2011.01)
*H04N 21/431* (2011.01)

(56) References Cited

U.S. PATENT DOCUMENTS

| | | | |
|---|---|---|---|
| 5,532,765 A * | 7/1996 | Inoue et al. | 348/807 |
| 5,760,829 A * | 6/1998 | Sussmeier | 348/187 |
| 6,061,102 A * | 5/2000 | Sheppard et al. | 348/745 |
| 6,483,537 B1 * | 11/2002 | Mayer et al. | 348/180 |
| 6,483,555 B1 * | 11/2002 | Thielemans et al. | 348/745 |
| 6,590,606 B1 * | 7/2003 | Hiller et al. | 348/203 |
| 6,611,249 B1 * | 8/2003 | Evanicky et al. | 345/102 |
| 6,717,625 B1 * | 4/2004 | Thielemans | 348/745 |
| 6,753,907 B1 * | 6/2004 | Sukthankar et al. | 348/222.1 |
| 6,982,744 B2 * | 1/2006 | Jenkins | 348/189 |
| 6,990,234 B2 * | 1/2006 | Kanai | 382/167 |
| 7,136,076 B2 * | 11/2006 | Evanicky et al. | 345/600 |
| 7,170,535 B2 * | 1/2007 | Matsuda | 345/690 |
| 7,266,246 B2 * | 9/2007 | Shaked et al. | 382/232 |
| 7,268,837 B2 * | 9/2007 | Melton | 348/807 |
| 7,755,706 B2 * | 7/2010 | Itaki | 348/745 |
| 7,901,095 B2 * | 3/2011 | Xiao et al. | 353/121 |
| 7,940,329 B2 * | 5/2011 | Houmeau et al. | 348/383 |
| 7,949,202 B2 * | 5/2011 | Matsuda | 382/275 |
| 8,031,271 B2 * | 10/2011 | Aufranc et al. | 348/745 |
| 8,106,949 B2 * | 1/2012 | Tan et al. | 348/180 |
| 8,174,626 B2 * | 5/2012 | Ouchi | 348/745 |
| 8,393,740 B2 * | 3/2013 | Sajadi et al. | 353/70 |
| 8,561,122 B2 * | 10/2013 | Kirk et al. | 725/140 |
| 8,587,728 B2 * | 11/2013 | De La Serna | 348/675 |
| 2003/0011563 A1 | 1/2003 | Wada | |
| 2005/0103976 A1 | 5/2005 | Ioka et al. | |
| 2007/0115440 A1 * | 5/2007 | Wiklof | 353/69 |
| 2011/0032363 A1 * | 2/2011 | Pines et al. | 348/177 |
| 2012/0135783 A1 * | 5/2012 | Sams | 455/556.1 |
| 2012/0135790 A1 * | 5/2012 | Powell et al. | 463/11 |

* cited by examiner

TELEVISION RECEIVER—PROJECTOR COMPENSATING OPTICAL PROPERTIES OF PROJECTION SURFACE

TECHNICAL FIELD

Embodiments discussed herein are directed to providing output from a projector component of a receiver. The output from the projector may include ambiance images or images that are compensated to account for optical characteristics of a projection surface.

BACKGROUND

Service providers who offer program service transmissions such as cable and satellite television providers, are increasingly offering improvements to the user's viewing experience. One such improvements includes receivers that are operable to project a visual image onto a projection surface. Such a projector/receiver provides an alternative to the familiar viewing of broadcast channels through the operation of a television set. In some instances, the operation of a projector may be influenced by ambient light conditions, colors, or color casts associated with a projection surface. The projected image may differ from user's expectations. Specifically, the projected image may differ from how the same image would appear if it were to be displayed through a television. Accordingly, it may be desirable to automatically alter the projected image in a way that provides compensation for ambient light conditions and/or visual characteristics associated with the projection surface.

SUMMARY

Embodiments discussed herein are directed to providing projected output from a receiver that includes ambiance or environmental images and sounds for display to and/or listening by a user. Other embodiments are directed to processing or altering program service video to produce a compensated video that is output by a projector component of a receiver. The modified image compensates for characteristics associated with the ambient light conditions and/or characteristics of the projection surface upon which the projector outputs an image. Modifying an image may include altering the color components of the output image in order to compensate for an inherent color associated with the projection surface and/or ambient light conditions. In certain instances, modifying an image may include dividing the projection surface into regions and modifying separate portions of a projected image based on where the portions of the projected image will fall on the projection surface.

One embodiment is directed to a method of providing a projected video image, comprising: determining, at a receiver, at least one optical property of a projection surface, the receiver operable to receive a program service and to project an image from the program service onto the projection surface; deriving a correction matrix based on the at least one optical property of the projection surface; applying the correction matrix to an image to obtain a compensated image; and projecting the compensated image onto the projection surface.

Another embodiment is directed to a receiver, comprising: a signal receiver operable to receive a broadcast service transmission having a number of programs service channels; a projection management module operable to receive a visual image from the broadcast service transmission and to modify the visual image based on at least one optical property of projection surface to produce a modified image; and a projector operable to project the modified visual image onto the projection surface.

Yet another embodiment is directed to a method of providing output from a receiver, comprising: determining, at a receiver, if a user is currently viewing a projection surface, the receiver operable to receive a program service and to project an image from the program service onto the projection surface; in response to determining that the user is viewing the projection surface, projecting program service content from the program service transmission onto the projection surface; and in response to determining that the user is not viewing the projection surface, projecting a still image onto the projection surface.

DETAILED DESCRIPTION

Embodiments discussed herein are directed to providing projected output from a receiver that includes ambiance or environmental images and sounds for display to and/or listening by a user. Other embodiments are directed to processing or altering program service video to produce a compensated video that is output by a projector component of a receiver. The modified image compensates for characteristics associated with the ambient light conditions and/or characteristics of the projection surface upon which the projector outputs an image. Modifying an image may include altering the color components of the output image in order to compensate for an inherent color associated with the projection surface and/or ambient light conditions. In certain instances, modifying an image may include dividing the projection surface into regions and modifying separate portions of a projected image based on where the portions of the projected image will fall on the projection surface.

As used herein, a "receiver" may be any device capable of receiving video and/or audio content included in a broadcast or other program service transmission from a service provider. As used herein, a "service provider" may include any service that provides a program service transmission to a receiver such as, without limitation, a satellite television service, a direct television service or a cable television service, or a streaming video delivered across a network such as the Internet. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

Figure 1A:
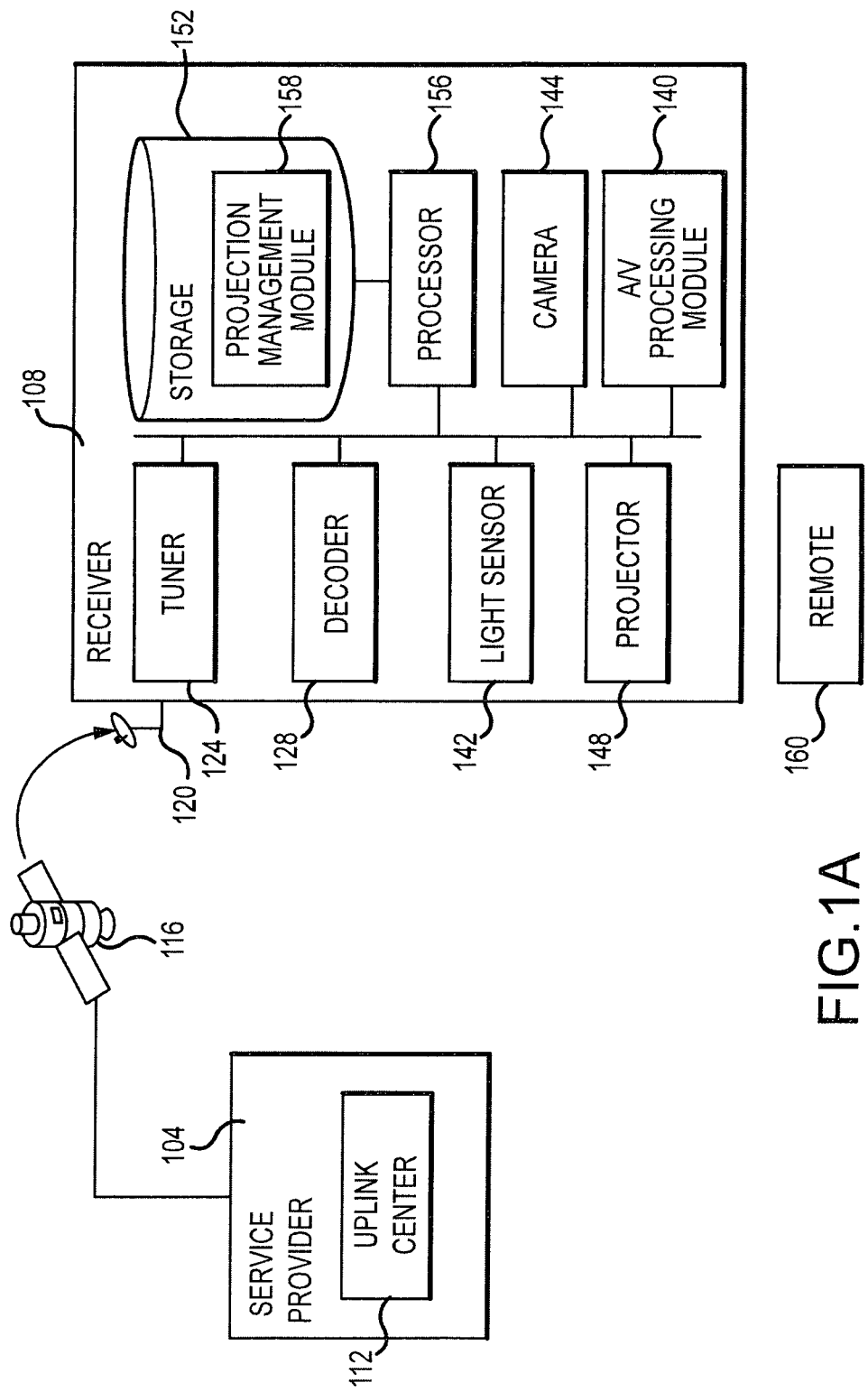
FIG. 1A is a schematic diagram showing components and feature of implementations discussed herein.

FIG. 1A is a schematic illustration of a general operating environment showing components and features of embodiments discussed herein. FIG. 1A includes a service provider 104 that transmits or otherwise provides a program service transmission to a receiver 108. The receiver 108 can include a set-top box (STB), Digital Video Recorder (DVR), a cable receiver, a general purpose computer, a handheld communications, device including but not limited to a table computer or a mobile phone, and so on. A receiver 108 may also include a cable modem that receives streaming audio. The receiver 108 may be associated with an individual, business or other entity, user or subscriber that receives a program service transmission from the service provider 104. Generally the terms "user" and/or "subscriber" refer to an individual or company who receives a program service transmission. This may include those who have purchased a subscription to the program service transmission. Alternatively, the terms "user" and/or "subscriber" may refer to individuals who have been given access to the program service transmission through promotional offers and/or other non-fee-based agreements.

In connection with certain embodiments that operate in the context of a satellite television service, the service provider 104 may provide a program service transmission through an uplink center 112. Implementations discussed, herein may utilize a direct broadcast satellite (DBS) system which can incorporate packetized transmission signals according to an appropriate standard, such as the MPEG-2 and/or MPEG-4 standards. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The retransmitted signal may be received from the satellite 116 at one or more satellite dishes 120, which are typically associated with one or more receivers 108. A receiver 108 may include a tuner 124 operable to receive the program service transmission signal through the satellite dish 120 and a decoder 128 to decode the received signal. The decoder 128 may be programmed to decrypt, demodulate, demultiplex or otherwise decode some or all of the received signals in accordance with purchases and selections made by a user. Output from the decoder 128 may be directed to an audio visual (A/V) processing module 140. The A/V processing module 140 may process the video and audio streams using digital-to-analog conversion techniques, or compressed digital to uncompressed digital conversion techniques, to produce one or more output signals.

It should be appreciated that the foregoing is but one discussion of a possible embodiment and product transmission service. It is noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks and/or the Internet.

The receiver 108 may include a projector 148 that is operable to output a visual image on to a projection service that is external to the receiver 108. In so doing, the projector 148 may output one or more channels from the program service transmission that is received at by the receiver 108. The receiver 108 may also include a camera 144 or may receive a signal generated by a camera 144. The camera 144 may be disposed or oriented within the receiver 108 such that the camera 144 is operable to photograph a projection surface that is used to display visual content output from the projector 148. Additionally, the receiver 108 may include a light sensor 142 or may receive a signal generated by a light sensor 142. The light sensor 142 may be operable to sense light reflected from the projection surface used by the projector 148 to display visual content.

The receiver 108 may include or be associated with a memory or other storage device 152, such as magnetic or optical storage. The storage device 152 may be operable to store data received from the decoded program service transmission. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may be removable in nature. The stored data set may include audio and/or visual content to be transmitted and output through an output device. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 156 operable to run executable code in connection with various functions associated with the receiver 108. For example, the processor 156 may display graphics, images, animations or other content through the output device 144. The processor 156 may be further operable to recall and display stored content, such as a purchased or recorded audio tracks or programs. The storage device 152 may store an application, file, or other data that is useable by the processor 156. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156.

The processor 156 may also perform such tasks as executing commands received from a user. User commands may be sent to the receiver 108 through a user input device 160 such as remote or other wireless device. As used herein, a "user input device" may include any device operable to receive input from a user and to convey the input to the receiver 108. In one embodiment, the user input device 160 may be a hand-held device having a number of buttons or keys that when actuated by a user cause the user input device to covey information to the receiver 108 using a suitable communication means, such as an infrared signal. The user input device 160 may include a pointing device or functionality that allows the user to control the position of a cursor that is displayed on an output device. For example, the user input device 160 may include a track ball or glide plane that may be manipulated to control cursor movements. The user input device 160 may include a motion sensor or accelerometer that allows a user to control displayed items or graphics, such as a cursor, through movements of his or her hand or arm that cause a displacement of the user input device 160. It should be appreciated that other input devices such as a computer mouse or touch screen may be used and other communication means, wired or wireless, may be used. Information sent to the receiver 108 may include, for example, a command to change the output channel. Commands sent to the receiver 108 may be entered through a dedicated display menu.

In one instance, a projection management module 158, which is stored in the storage device 152, may be executed by the processor 156 to process and/or alter video content that is delivered to the projection surface by the projector 148. In instances where the receiver 108 is not otherwise being used to display program service content or channels, the projection management module 158 may be operable to output ambiance or environmental images and sounds for display from the receiver 108 through at least the projector 148 and/or an associated sound system. When the receiver 108 being used, the projection management module 158 may be operable to alter the output image sent by the projector 148 in order to compensate for characteristics associated with the ambient light conditions and/or characteristics of the projection surface used by the projector 148 to display the broadcast channel. The altered output image may be a video from a particular broadcast channel or a video that is recorded or otherwise stored locally at the receiver 108. Additionally, the projection management module 158 may be operable to alter the shape of the projected image to account for receiver orientations that are not perpendicular to the projection surface.

Figure 1B:
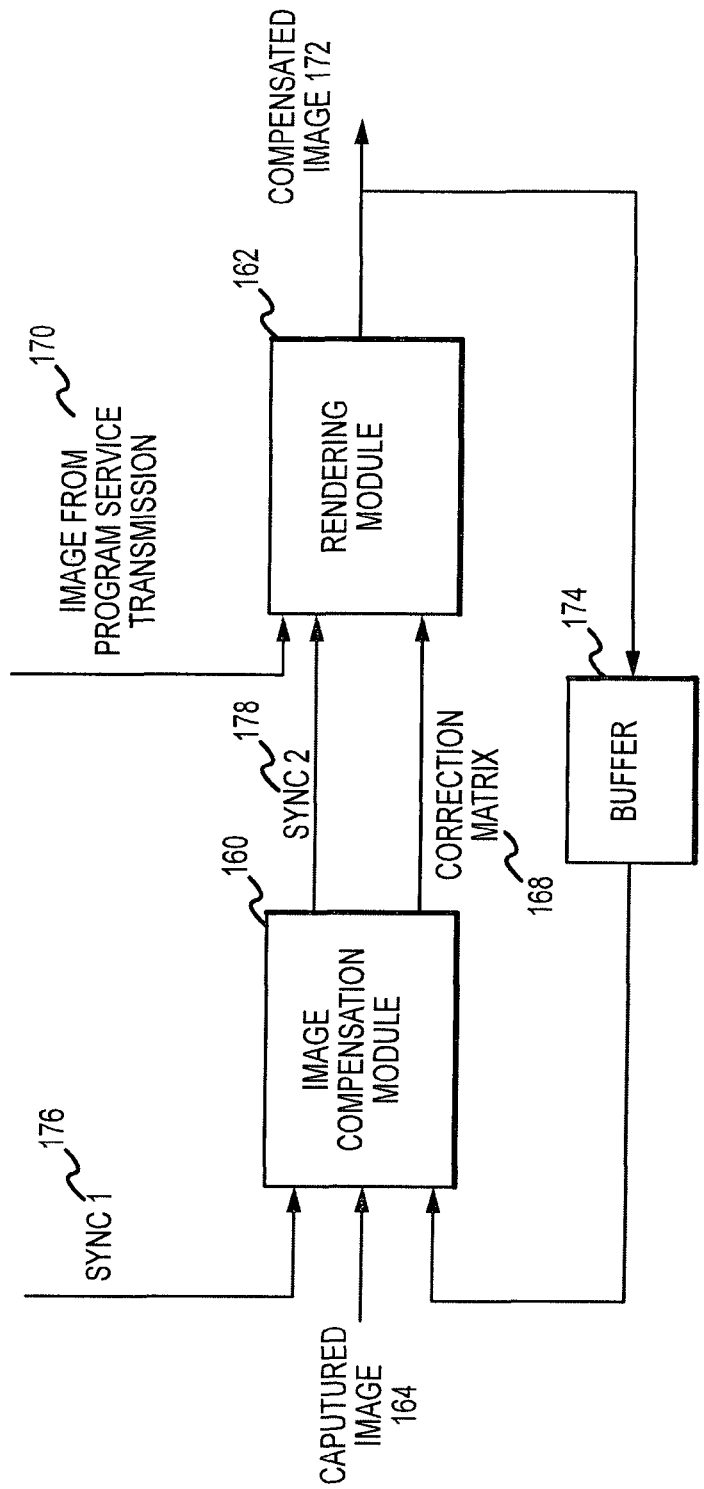
FIG. 1B is a schematic diagram showing further detail for the projection management module shown in FIG. 1A.

When used to alter an output image, the projection management module 158 may configured to process color data from a projection surface and to derive a correction matrix that when applied to the incoming program data alters the image from the program data in order to compensate for inherent colors in the projection surface. A projection management module 158 configured to execute these embodiments is illustrated in FIG. 1B. The projection management module 158 shown in FIG. 1B includes an image compensation module 160 and a rendering module 162. The image compensation module 160 receives an image 164 of the projection surface as input. The image compensation module 160 processes the image 164 and outputs a correction matrix 168 to the rendering module 162. The rendering module 162 additionally receives image data 170 from the program service transmission, which it processes based on the correction matrix 168. Based on this processing, the rendering module 162 outputs a compensated image 172 that may be output from the projector 148. In certain embodiments, the compensated image 172 may be fed back through a buffer 174 to the image compensation module 160 where it is compared to the captured image 164 on a continual basis. The projection management module 158 may additionally include a first sync signal 176 configured to synchronize the captured image 164 with the compensated image 172, and a second sync signal 178 configured to synchronize the correction matrix 168 with the image 170 form the program service transmission.

Figure 2:
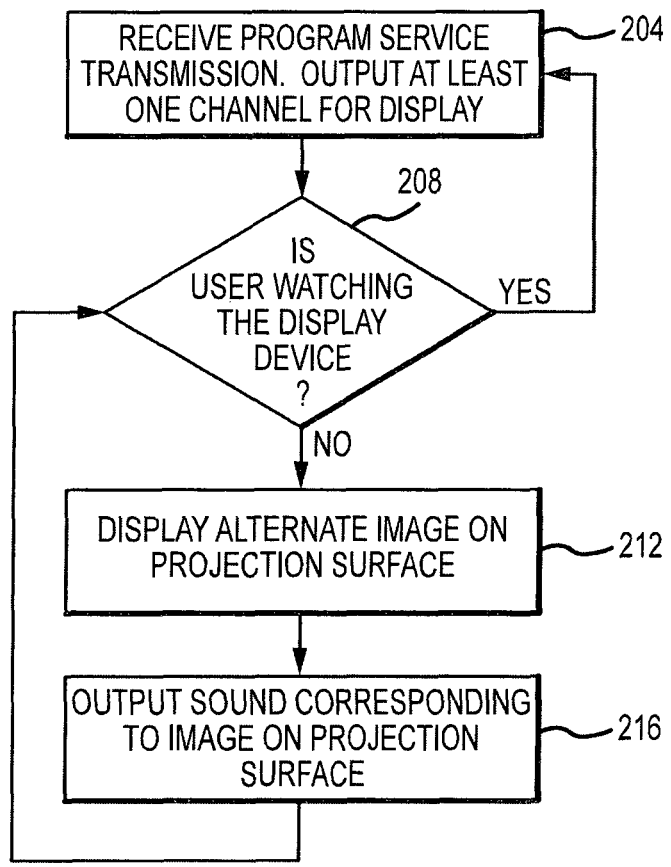
FIG. 2 is a flow chart that illustrates a method in accordance with implementations discussed herein.

FIG. 2 is a flow chart that illustrates a method of providing output from a receiver 108 having a projector 148. In the embodiment illustrated in FIG. 2, the receiver 108 is operable to project pleasing images and/or sounds at times when the receiver 108 is idle or otherwise not being used to view a broadcast channel. Initially, in operation 204, the receiver receives a program service transmission from a service provider 104. As described above this may include receiving a signal having program service transmission and processing the signal through the operation of the tuner 124, demodulator 128, and so on. Operation 204 additionally includes outputting at least one channel from the broadcast service transmission for display to a user. This display may include projecting an image through the operation of a projector 148 on an external display surface such as a wall. Following operation 204, operation 208 may be executed.

In operation 208, the projection management module 158 determines if a user is currently watching the visual image output from the projector 148. Operation 208 may include face recognition or eyeball tracking techniques that may determine if a user is currently watching the output video. In these instances, the user may be free from having to specifically input commands that indicate whether or not he or she is watching the output video. In another embodiment, the user may send signals to the receiver 108 through the remote 160 that indicates a particular mode in which the receiver 108 should operate. Such modes may include a mode for watching visual content associated with a broadcast or other program service channel. Another mode of operation for the receiver 108 may include an "ambience mood" in which certain images are shown on the projection surface. According, if in operation 208, it is determined that a user is currently watching the program service transmission or broadcast channel, operation 204 may again be executed such that the program service transmission is received and the broadcast channel is output from the receiver 108. If, however, in operation 208, the projection management module 158 determines that the user is not watching the program service channel, operation 212 may be executed following operation 208.

In operation 212, the projection management module 158 may display an alternative image on the projection surface. In one embodiment, this may include projecting oceanic images, jungle images, or other soothing, ambience-type output. Following operation 212, operation 216 may be executed. In operation 216, the receiver 108 may output sounds to an associated sound system. The sounds may correspond to the image displayed from the projector 148 in operation 212. Following operation 216, operation 208 may be executed again. As described above, in operation 208, the projection management module 158 determines if the user is currently using the receiver to view a broadcast channel and alters the video output accordingly.

Figure 3A:
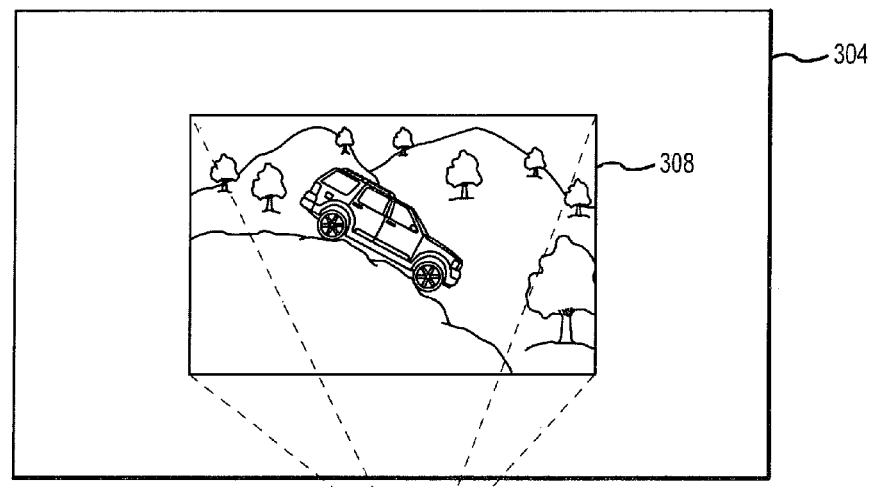
FIG. 3A and FIG. 3B are illustrations of visual output in accordance with the method illustrated in FIG. 2.
Figure 3B:
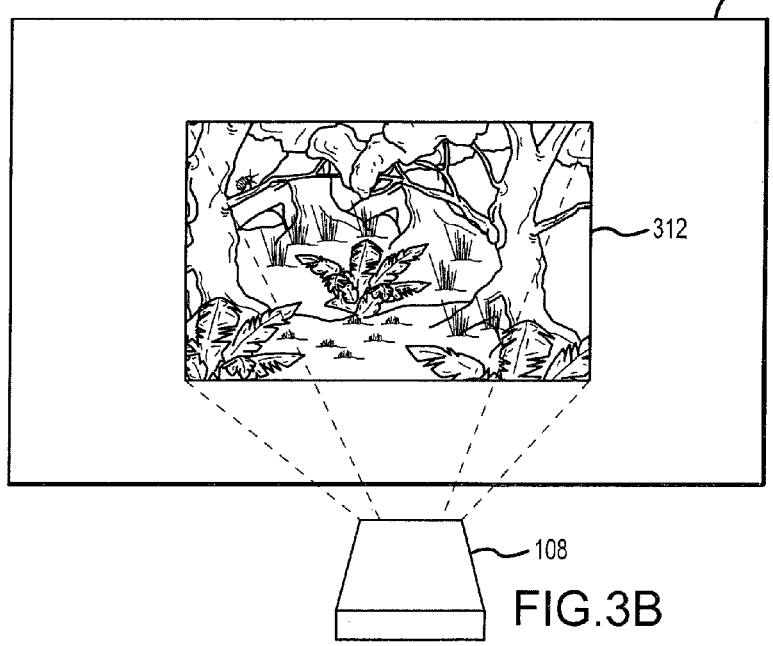

FIG. 3A and FIG. 3B illustrate video output from the receiver 108 in accordance with the embodiment illustrated in FIG. 2. FIG. 3A includes a receiver 108 provided in association with a projection surface 304. The receiver 108 projects an image 308 onto the projection surface 304. The image 308 shown in FIG. 3A corresponds to program content associated with a program service channel. Such a visual output as shown in FIG. 3A may correspond to a normal viewing mode associated with operation 204 shown in FIG. 2. Once a user indicates that he is not watching the program service or otherwise is determined to be away from the direct viewing of the program service channel, the receiver 108 may shift to an ambiance mode as shown in FIG. 3B. In FIG. 3B, the receiver 108 outputs one or more ambiance images 312 that may be static images, a series of static images, or a motion picture. As shown in FIG. 3B, the receiver 108 may output a visual image, for example a jungle or other verdant area. In combination with this visual image, the receiver 108 may additionally output noises and/or other sounds associated with a jungle-type environment such as birds and other jungle animals. In so doing, the receiver 108 may produce a general ambiance feeling given by the combination of the image and associated sounds.

Figure 4:
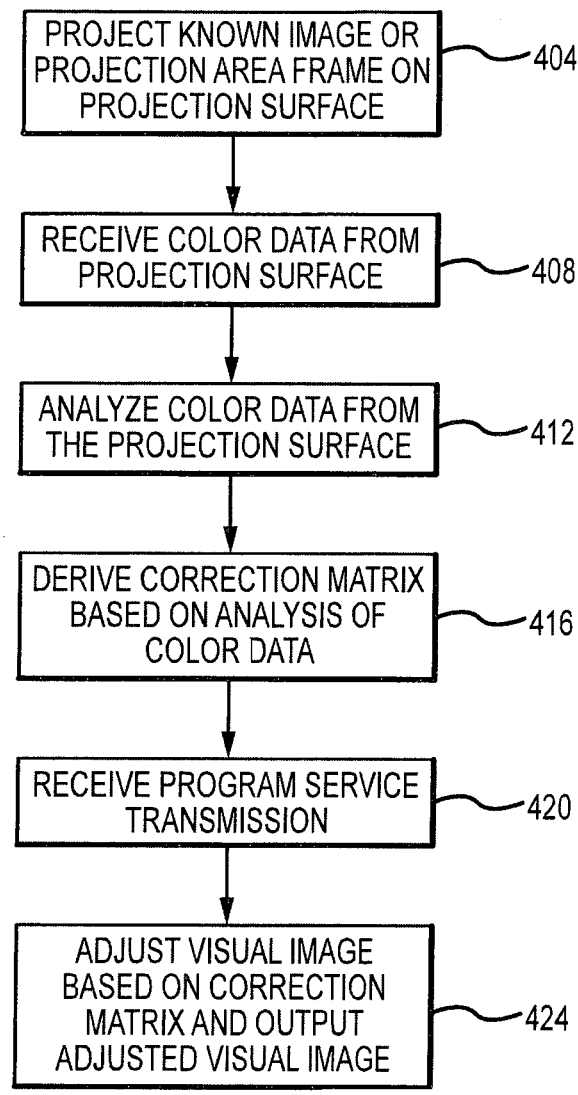
FIG. 4 is a flow chart that illustrates another method in accordance with implementations discussed herein.

FIG. 4 is a flow chart that illustrates a method in accordance with embodiments discussed herein. In the method illustrated in FIG. 4, the projection management module 158 is operable to alter or otherwise process an incoming broadcast or program service signal in order to compensate for characteristics of a projection surface. Initially, at operation 408, the receiver 108 may project a known image on to the projection surface used by the projector 148. This known image may be, for example, an Society of Motion Picture and Television Engineers (SMPTE) color bar pattern. Projecting the known image on the projection surface may serve as mechanism for allowing the projection management module to analyze the color produced by the interaction between a projected color and the inherent color of the projection surface. In accordance with certain embodiments, the image projected in operation 408 does not include colors, but rather a frame or portions of a frame that encloses the area on which a program image will be projected. In this embodiment, the colors produced or reflected by the inherent colors of the projection surface are analyzed apart from any interaction with a test color. Following operation 404, operation 408 may be executed.

In operation 408, the receiver 108 may receive color data from the projection surface 408. Operation 408 may include receiving color data that represents the inherent colors of the projection surface and/or color data that represents the interaction between the inherent colors of the wall and a known projected color. In one embodiment, receiving color data may include light sensor 142 input that may be acquired from light reflected by the projection surface. In accordance with other embodiments, the color data may be a photograph or other visual image captured by a camera 144. The image for other visual data captured by the camera 144 may correspond to a photograph of the projections surface taken while the known image is projected thereon. In certain embodiments, the image captured by the camera 144 may correspond to an image of the projection surface without any image specific color, image or pattern projected thereon. Here, the captured image may be cropped to exclude portions that will be used to display a program image. The captured image may be cropped based on the frame or portions of a frame that are projected in operation 404. Following operation 408, operation 412 may be executed.

In operation 412, the projection management module 158 may analyze the color data received in operation 408. Operation 412 may include determining the location of the color of the projection surface within a given color space. As can be appreciated by one of skill in the art, a "color space" is a mathematical or graphical representation of a color spectrum based on the contribution that each of a number of color components gives to a particular color in the color spectrum. Typically, a color space has a central area that is white and represents equal contributions from all color components. In an RGB color model, the central white area represents equal contributions from the red, green and blue components. Points near the central area may have a color hue that represents a slightly greater contribution from one or more of the color components. For example, in the RGB color model, a yellow hue may represent a greater contribution from the red and green components and a lesser contribution from the blue component. Points on the edges of the color space or points that are otherwise located at an appreciable distance from the central white area, may have deep colors that represent significant contributions from one or more color components. For example, a deep blue may represent a significant contribution from the blue component and negligible contribution from the red and green components.

Following operation 412, operation 416 may be executed. In operation 416, the projection management module 158 may derive a correction matrix based on the analysis of the color data from operation 412. The correction matrix may include a two dimensional matrix, in which each matrix entry corresponds to a pixel in the projected image. As can be appreciated by one of skill in the art, a pixel in the projected image may be produced by the combined contributions of a number of color elements. In the RGB additive color model, each pixel is produced by a red color element, a green color element, and blue color element that each act on a given point in the image. Each of the three color elements act with a certain intensity such that the combined effect is to produce a pixel of desired color. The correction matrix may be a two dimensional matrix of "tuple" numbers that each have an ordered list of numbers. Each number in the tuple number corresponds to an intensity for a particular color element. In connection with an RGB color model, each tuple number includes a red intensity, a green intensity, and a blue intensity.

The correction matrix derived in operation 412 is adapted to be applied to one or more frames of a broadcast program in order to alter the output image. Like the correction matrix, each frame of a broadcast program will include tuple numbers for each pixel that specify intensity values for each color element. The correction matrix may be adapted to be applied on a pixel-by-pixel basis as color intensity adjustment values to the frames of the broadcast program. This may include adding the numbers in each tuple number of the correction matrix to each number in each tuple number of the corresponding pixel in the broadcast program frame. This application of the correction matrix to the broadcast program frame may result in a modified program frame that can then be output from the projector. The numbers of each tuple number may be either positive or negative. A positive number may represent an increase in intensity for the corresponding color element. Likewise, a negative number may represent a decrease in intensity for the corresponding color element.

In operation 416, the projection management module 158 may derive the correction matrix such that when applied to a broadcast program frame, the correction matrix alters the visual content received from the program service transmission in order to compensate for characteristics of the projection surface. Here, the correction matrix may be derived based on the analysis of the color data performed in operation 412. For example, the analysis of color data may indicate that the color of the projection surface is close to the center of the color space, but contains a hue of a certain color. In this instance, the correction matrix may be derived to compensate for the hue of the projection surface. For example, if the projection surface has a yellowish hue, the correction matrix may include tuple values that slightly reduce the intensity of the green and red color components (or slightly increase the intensity of the blue component), as appropriate, in order to compensate for the color of the projection surface.

In some instances, the analysis of color data performed in operation 412 may indicate that the projection surface contains deep colors or colors that are on the edge of the color space. Due to the presence of these deep colors, the projection management module 158 may determine that the broadcast program frame may not be adjusted to fully compensate for the inherent colors of the projection surface. In these instances, the projection management module 158 may take a "best effort" approach and boost the intensity of each pixel in order to produce as bright a picture as possible. Here, operation 416 may derive a correction matrix that adds equal amounts of intensity to each color element for each pixel in order to produce a brighter picture. Specifically, the projection management module 158 may apply the pixel scaling factor to each pixel in the video to obtain the compensated video.

Following operation 416, operation 420 may be executed. In operation 420, the receiver 108 may receive the program service transmission from the service provider 104. As described above, this may include receiving a program service transmission which is processed through the operation of tuner 124, demodulator 128 and so on. Following or concurrently with operation 420, operation 424 may be executed. In operation 424, the projection management module 158 may alter the received visual image based upon the correction matrix derived in operation 416. Additionally, in operation 424, the receiver 108 may output the adjusted visual image through the projector 148 for display on the projection surface.

Figure 5:
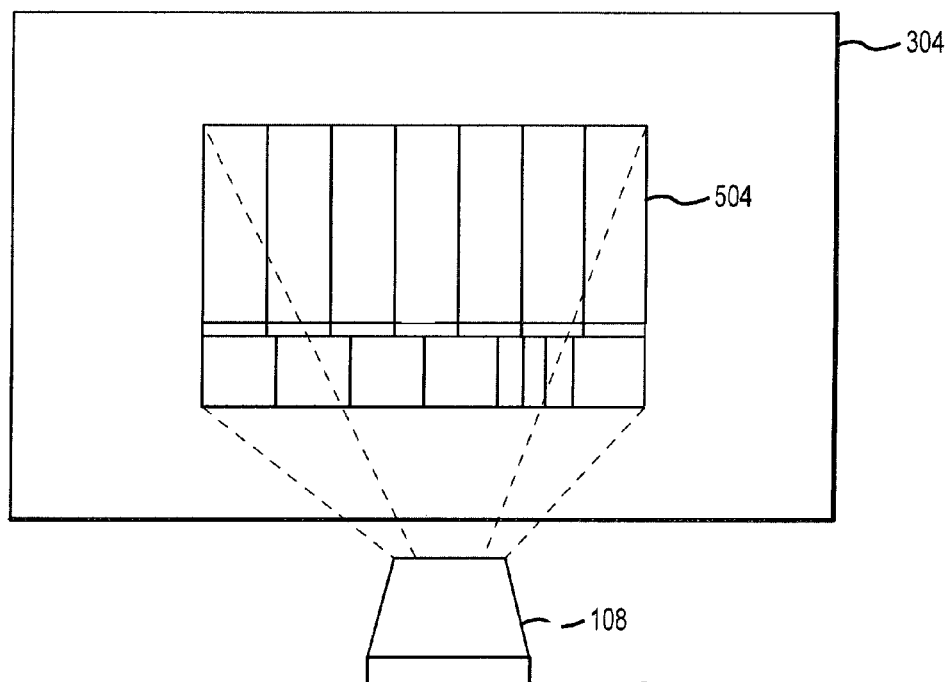
FIG. 5 is an illustration of visual output in accordance with the method illustrated in FIG. 4.

FIG. 5 includes an illustration of a display of a test image in accordance with the method illustrated in FIG. 4. FIG. 5 shows a receiver 108 that projects an image 504 on the projection surface 304. The image 504 may in one embodiment be a SMPTE image which shows a number of color regions which may in turn be processed by the receiver 108 to determine the color quality of the projected image. In accordance with certain embodiments, the image 504 does not include colors, but rather a frame or portions of a frame that encloses the area on which a program image will be projected.

Figure 6:
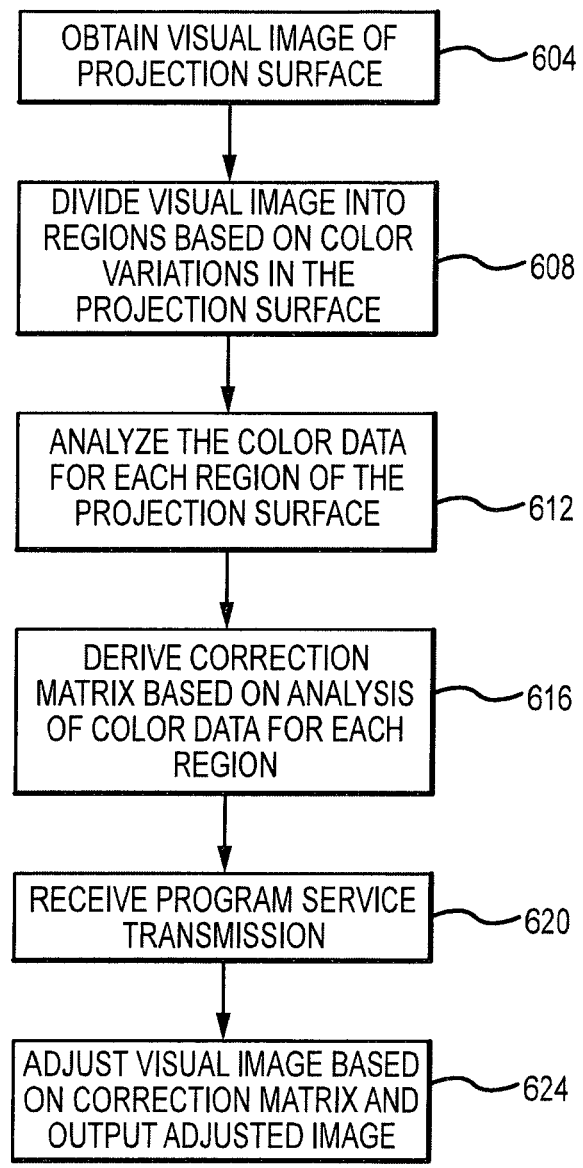
FIG. 6 is a flow chart that illustrates still another method in accordance with implementations discussed herein.

FIG. 6 is an illustration of a method in accordance with embodiments described herein. The method illustrated in FIG. 6 includes an operation of a receiver 108 that alters an image received from a program service transmission in order to output a visual image that compensates for variable color patterns in the projection surface. Initially, at operation 604, the receiver 108 obtains color data of a projection surface. Operation 604 may include photographing or otherwise capturing image of the projection surface through the operation of the camera 144. Following operation 604, operation 608 may be executed.

Figure 7A:
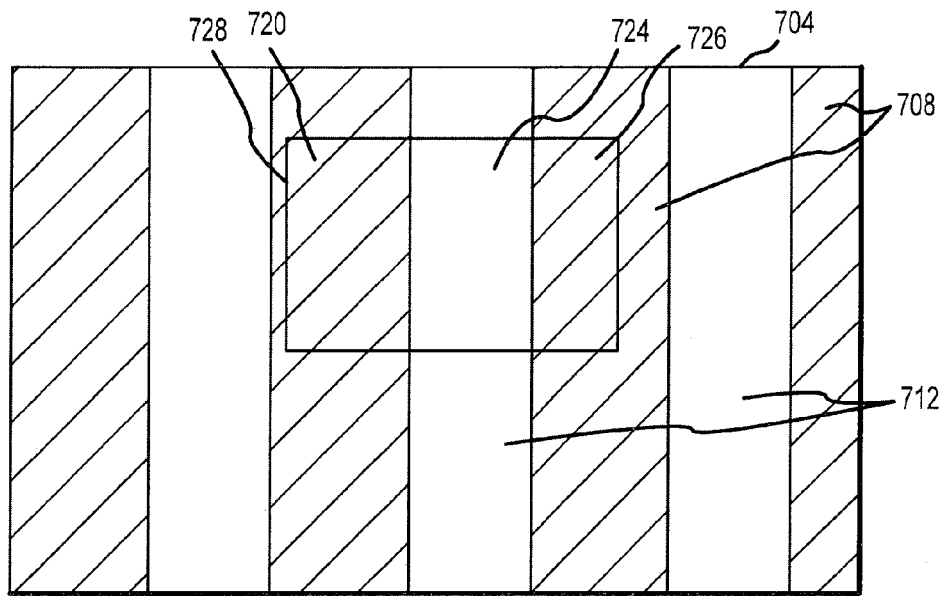
FIG. 7A and FIG. 7B are illustrations of visual output in accordance with the method illustrated in FIG. 6.
Figure 7A:
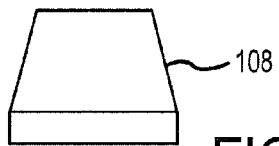

In operation 608, the projection management module 158 may divide the image into regions or tiles based on color variations within the image. Operation 608 may be understood with reference to FIG. 7A, which includes a receiver 108 provided in association with a projection surface 704. As shown in FIG. 7A, the projection surface 704 includes an irregular color pattern. Specifically, the projection surface 704 includes a number of regions 708 having a first color (indicated by cross-hatching). Additionally, the projection surface 704 includes a number of other regions 712 having a second color. FIG. 7A additionally includes a framed area 728 within which an image will be projected. Accordingly, in operation 608, the projection management module 158 may divide the captured image corresponding to the framed area 728 into three regions, corresponding to the three areas 720, 724 and 726 shown in FIG. 7A. Following operation 608, operation 612 may be executed.

In operation 612, the projection management module 158 may analyze the color data received in operation 604. Operation 612 may include determining the location of the color of each region of the projection surface within a given color space. Continuing with the above example, the projection management module 158 may determine that various regions of the projection surface are located at different points within the color space. For example, region 724 may be white and thus located substantially in the center of the color space. Regions 720 and 726 may have a slight color hue, thus locating them near the center of the color space. Alternatively, regions 720 and 726 may contain a deep color, thus locating them at the edge of the color space or otherwise at an appreciable distance from the center of the color space. Following operation 612, operation 616 may be executed.

In operation 616, the projection management module 158 may derive a correction matrix based on the analysis of the color data from operation 604. The correction matrix derived in operation 612 is adapted to be applied to one or more frames of a broadcast program in order to alter the output image. In operation 612, the projection management module 158 may derive the correction matrix such that when applied to a broadcast program frame, the correction matrix alters the visual content received from the program service transmission in order to compensate for characteristics of the projection surface. Here, the correction matrix may be derived based on the analysis of the color data performed in operation 604.

The tuple numbers for the correction matrix derived in operation 616 may differ depending on which region of the projection surface the corresponding pixel is located. Continuing with the above example, the tuple numbers for pixels in the white region 720 may be zero or close to zero, thereby causing no adjustment to that portion of the projection that falls in region 720. In contrast, the tuple number for pixels in colored regions 720 and 726 may be non-zero to adjust those portions of the projection that fall in regions 720 and 726 in order to compensate for the inherent colors. As described above, the non-zero tuple numbers may adjust the intensity of various color elements to compensate for a color hue, or they may increase the overall brightness of the color elements in order to compensate for deep colors.

Following operation 616, operation 620 may be executed. In operation 620, the receiver 108 may receive the program service transmission from the service provider 104. As described above, this may include receiving a program service transmission which is processed through the operation of tuner 124, demodulator 128 and so on. Following or concurrently with operation 620, operation 624 may be executed. In operation 624, the projection management module 158 may alter the received visual image based upon the correction matrix derived in operation 616. Additionally, in operation 624, the receiver 108 may output the adjusted visual image through the projector 148 for display on the projection surface.

Figure 7B:
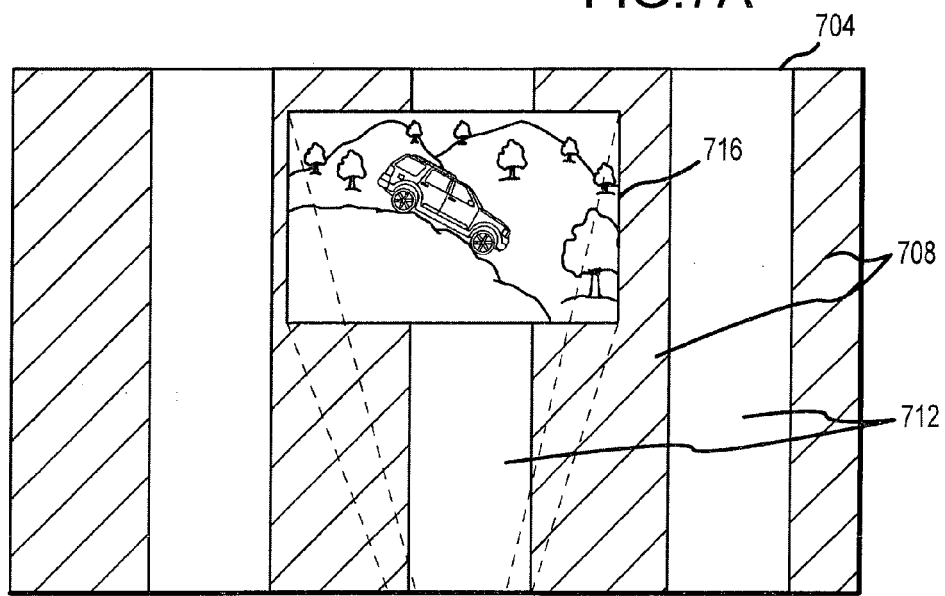
Figure 7B:
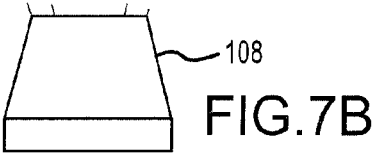

FIG. 7B illustrates visual output from the receiver 148 operating in accordance with the method illustrated in FIG. 6. In FIG. 7B, the compensated visual image is projected from the receiver 108 on to the projection surface 704. In so doing, the projection management module 158 alters the visual image received from the service provider at the pixel level such that the image is prepared to be appropriately projected onto the projection surface 704. Once the compensated image is displayed on the projection surface 704, the images interacts with the wall to thereby produce an expected visual image. This expected visual image is illustrated in FIG. 7B in which a visual image 716 is output from the receiver 108 and seen on the projection surface 704 without interference from the underlying color regions of the projection surface 704.

In addition to compensating for color cast or color variations, the projection management module 158 may also be operable to alter the shape of the projected image to account for receiver 108 orientations that are not perpendicular to the projection surface. If the receiver 108 were to be positioned in an angled orientation with respect to the projection surface, an unaltered video projection would not be rectangular. In this orientation, the resulting image would be distorted. Accordingly, the receiver 148 may include one more distance and/or position sensors that are operable to measure an angle at which the projection surface is oriented with respect to the projector 148. The projection management module 158 may then correct the projected image to compensate for the angle of the projection surface. Following this, the corrected image may be projected onto the projection surface resulting in an undistorted image.

Embodiments are herein discussed in the context of altering or modify visual content received from a program service transmission. It should be appreciated that the techniques, discussed herein may also be applied to video or image from other sources. In one embodiment the compensation techniques discussed herein may be applied to video that is stored locally at the receiver. Such stored content may include, for example, DVR videos or other recordings or rented pay-per-view items. The compensation techniques discussed herein may also be applied to the ambiance and/or environmental images that are displayed when the receiver is idle or otherwise not in use.

While embodiments are discussed herein in connection with the exemplary satellite broadcast system shown in FIG. 1A, it should be appreciated that embodiments may be used in connection other types of networks or content delivery mechanisms. Generally, the disclosure includes content delivered from a provider to a receiver across or over a network. The network across which content may be delivered may include satellite system, such as the one shown in FIG. 1A. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 2, FIG. 4 and FIG. 6, described herein is by way of example and limitation. Certain implementations may reorder method operations without departing from the spirit and scope of the disclosure.

The invention claimed is:

1. A method of providing a projected video image, comprising:
   projecting a test image onto a non-electronic projection surface, at least two areas of the non-electronic projection surface having different optical properties, the different optical properties causing the at least two areas of the non-electronic projection surface to appear visually different;
   obtaining a captured image of a the non-electronic projection surface;
   cropping the captured image within a frame to exclude some or all of an area enclosed by the frame, the frame corresponding to an area on the non-electronic projection surface where a compensated image will be projected;
   determining, at a receiver, at least one optical property of the different optical properties, the receiver operable to receive a program service and to output an image for presentation on the non-electronic projection surface;
   deriving a correction matrix based on the at least one optical property of the different optical properties, the correction matrix including correction values for the at least two areas of the non-electronic projection surface with different optical properties;
   applying the correction matrix to the image for presentation to obtain the compensated image; and
   projecting the compensated image onto the non-electronic projection surface.

2. The method of claim 1, wherein the act of determining, at the receiver, at least one optical property further comprises:
   receiving input from an interaction between the test image and the non-electronic projection surface to determine the at least one optical property of the different optical properties of the non-electronic projection surface.

3. The method of claim 2, wherein the operation of receiving input comprises receiving input from a light sensor when the test image is projected on the non-electronic projection surface.

4. The method of claim 2, wherein the operation of receiving input comprises photographing the non-electronic projection surface when the test image is projected on the non-electronic projection surface.

5. The method of claim 1, wherein the operation of determining at least one optical property of the different optical properties comprises obtaining a visual image of at least a portion of the non-electronic projection surface.

6. The method of claim 5, wherein the operation of deriving the correction matrix comprises deriving a plurality of color intensity adjustment values based on the different optical properties of the non-electronic projection surface.

7. The method of claim 6, wherein a particular color intensity adjustment value includes an ordered list of values, each value in the ordered list of values corresponding to an intensity of a color element component for a single pixel of the compensated image on the non-electronic projection surface.

8. The method of claim 6, wherein the operation of deriving the plurality of color intensity adjustment values includes determining at least a first group of color intensity adjustment values and a second group of color intensity adjustment values, wherein the first group of color intensity adjustment values corresponds to a first one of the at least two areas of the non-electronic projection surface having different optical properties, the first one of the at least two areas having a first color, and wherein the second group of color intensity adjustment values corresponds to a second one of the at least two areas of the non-electronic projection surface having different optical properties, the second one of the at least two areas having a second color.

9. The method of claim 8, wherein the operation of applying the correction matrix to an image to obtain a compensated image comprises:
   applying the first group of color intensity adjustment values to each pixel in the image that will be projected onto the first one of the at least two areas of the non-electronic projection surface; and
   applying the second group of color intensity adjustment values to each pixel in the image that will be projected onto the second one of the at least two areas of the non-electronic projection surface.

10. A receiver, comprising:
    a signal receiver operable to receive a broadcast service transmission having a number of programs service channels;
    a projector operable to project a test image onto a non-electronic projection surface, at least two areas of the non-electronic projection surface having different optical properties, the different optical properties causing the at least two areas of the non-electronic projection surface to appear visually different;
    a projection management module operable to:
       obtain a captured image of a the non-electronic projection surface;
       crop the captured image within a frame to exclude some or all of an area enclosed by the frame, the frame corresponding to an area on the non-electronic projection surface where a modified image will be projected;
       determine at least one optical property of the different optical properties;

derive a correction matrix based on the at least one optical property of the different optical properties, the correction matrix including correction values for the at least two areas of the non-electronic projection surface with different optical properties;

receive a visual image from the broadcast service transmission; and modify the visual image based on the correction matrix to produce the modified image; and a projector operable to project the modified visual image onto the projection surface.

11. The receiver of claim 10, further comprising:

a camera operable to generate the captured image of the non-electronic projection surface.

12. The receiver of claim 10, further comprising:

a light sensor operable to receive and measure light reflected from the non-electronic projection surface, wherein the projection management module is operable to use the light measurements from the non-electronic projection surface to modify the visual image.

13. The receiver of claim 10, wherein the projection management module further comprises:

an image compensation module that receives the at least one optical property of the different optical properties as an input, the image compensation module configured to derive the correction matrix as an output; and a rendering module connected to the image compensation module and configured to receive the visual image from the broadcast service transmission and the correction matrix as an input, the rendering module further configured to provide the modified visual image as an output.

14. The receiver of claim 10, wherein the projection management module further comprises:

a buffer configured to receive the modified visual image as an input and configured to provide the modified visual image as a feedback input to the image compensation module.

15. The receiver of claim 10, wherein the image compensation module derives a plurality of color intensity adjustment values for the correction matrix based on the different optical properties of the non-electronic projection surface, wherein a particular color intensity adjustment value includes an ordered list of values, each value in the ordered list of values corresponding to an intensity of a color element component for a single pixel of the modified image on the non-electronic projection surface.

16. The receiver of claim 15, wherein the plurality of color intensity adjustment values includes at least a first group of color intensity adjustment values and a second group of color intensity adjustment values, wherein the first group of color intensity adjustment values corresponds to a first one of the at least two areas of the non-electronic projection surface having different optical properties, the first one of the at least two areas having a first color, and wherein the second group of color intensity adjustment values corresponds to a second one of the at least two areas of the non-electronic projection surface having different optical properties, the second one of the at least two areas having a second color.

17. A receiving device, comprising:

a decoder configured to receive programming and to generate a video signal;

an imaging device configured to capture a test image projected on a wall, the wall having a first area with a first optical property and a second area with a second optical property, the first optical property different from the second optical property, the difference in optical properties causing the first area of the wall to appear visually different from the second area of the wall;

an image compensation module configured to:

analyze the captured test image of the wall;

crop the captured test image within a frame to exclude an area enclosed by the frame, the frame corresponding to an area on the wall where a modified image will be projected;

produce a correction matrix based on an optical difference between the first and second optical properties, the correction matrix including correction values for the first and second areas of the wall; and modify the video signal based on the correction matrix, the modification including changing a portion of the video signal that corresponds to at least one of the two areas of the captured test image; and a projector configured to project the modified video signal onto the wall.

18. The receiving device of claim 17, wherein the generated video signal is configured for projection onto the wall as a sequence of visible video images.

19. The receiving device of claim 17, wherein the imaging device configured to capture the test image projected on the wall is configured to capture an image of a portion of a wall.

20. The receiving device of claim 17, wherein the difference in optical properties is a difference between a color of the first area and a second color of the second area.

21. The receiving device of claim 17, wherein changing a portion of the video signal includes altering at least one color component of the video signal that corresponds to the at least one of the first area and the second area of the wall.

* * * * *